United States Patent
Pan et al.

(10) Patent No.: US 11,860,634 B2
(45) Date of Patent: Jan. 2, 2024

(54) LANE-ATTENTION: PREDICTING VEHICLES' MOVING TRAJECTORIES BY LEARNING THEIR ATTENTION OVER LANES

(71) Applicant: Baidu USA LLC, Sunnyvale, CA (US)

(72) Inventors: Jiacheng Pan, Sunnyvale, CA (US);
Hongyi Sun, Sunnyvale, CA (US);
Kecheng Xu, Sunnyvale, CA (US);
Yifei Jiang, Sunnyvale, CA (US);
Xiangquan Xiao, Sunnyvale, CA (US);
Jiangtao Hu, Sunnyvale, CA (US);
Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 249 days.

(21) Appl. No.: 16/712,317

(22) Filed: Dec. 12, 2019

(65) Prior Publication Data
US 2021/0179097 A1    Jun. 17, 2021

(51) Int. Cl.
*G05D 1/02* (2020.01)
*B60W 30/095* (2012.01)
*G06N 3/04* (2023.01)
*G05D 1/00* (2006.01)
*G06V 20/58* (2022.01)
*G06V 10/764* (2022.01)
(Continued)

(52) U.S. Cl.
CPC ....... *G05D 1/0212* (2013.01); *B60W 30/0956* (2013.01); *G05D 1/0088* (2013.01); *G05D 1/0214* (2013.01); *G06N 3/04* (2013.01); *G06V 10/44* (2022.01); *G06V 10/764* (2022.01); *G06V 10/82* (2022.01); *G06V 20/58* (2022.01); *G06V 20/588* (2022.01); *G05D 2201/0213* (2013.01)

(58) Field of Classification Search
None
See application file for complete search history.

(56) References Cited

U.S. PATENT DOCUMENTS 10,877,482 B2 *   12/2020   Kindo ................... B60W 50/14
2019/0077398 A1 *   3/2019   Kusano ........... B60W 30/18163
(Continued)

FOREIGN PATENT DOCUMENTS

WO    WO-2020035728 A2 *   2/2020   ............ B60W 30/09

OTHER PUBLICATIONS

Jain et al., Structural-RNN: Deep Learning on Spatio-Temporal Graphs, 2016, IEEE. (Year: 2016).*

*Primary Examiner* — Jelani A Smith
*Assistant Examiner* — Davin Seol
(74) *Attorney, Agent, or Firm* — WOMBLE BOND DICKINSON (US) LLP

(57) ABSTRACT

An obstacle state evolution of a spatial position of a moving obstacle over a period of time is determined. A lane-obstacle relation evolution of the moving obstacle with each of one or more lanes near the moving obstacle over the period of time is further determined. An intended movement of the moving obstacle is predicted based on the obstacle state evolution and the lane-obstacle evolution. Thereafter, a trajectory of the ADV is planned to control the ADV to avoid a collision with the moving obstacle based on the predicted intended movement of the moving obstacle. The above process is iteratively performed for each of the moving obstacles detected within a predetermined proximity of the ADV.

26 Claims, 11 Drawing Sheets

(51) Int. Cl.
*G06V 10/82* (2022.01)
*G06V 10/44* (2022.01)
*G06V 20/56* (2022.01)

(56) References Cited

U.S. PATENT DOCUMENTS

| | | | |
|---|---|---|---|
| 2020/0013281 A1* | 1/2020 | Eriksson | G01S 19/393 |
| 2020/0182633 A1* | 6/2020 | Liu | G01C 21/3407 |
| 2021/0086798 A1* | 3/2021 | Saxena | B60W 30/18163 |
| 2021/0096241 A1* | 4/2021 | Bongio Karrman | G05D 1/0257 |
| 2021/0171025 A1* | 6/2021 | Ishikawa | G06N 3/08 |
| 2022/0105929 A1* | 4/2022 | Takei | B60W 30/0956 |

* cited by examiner

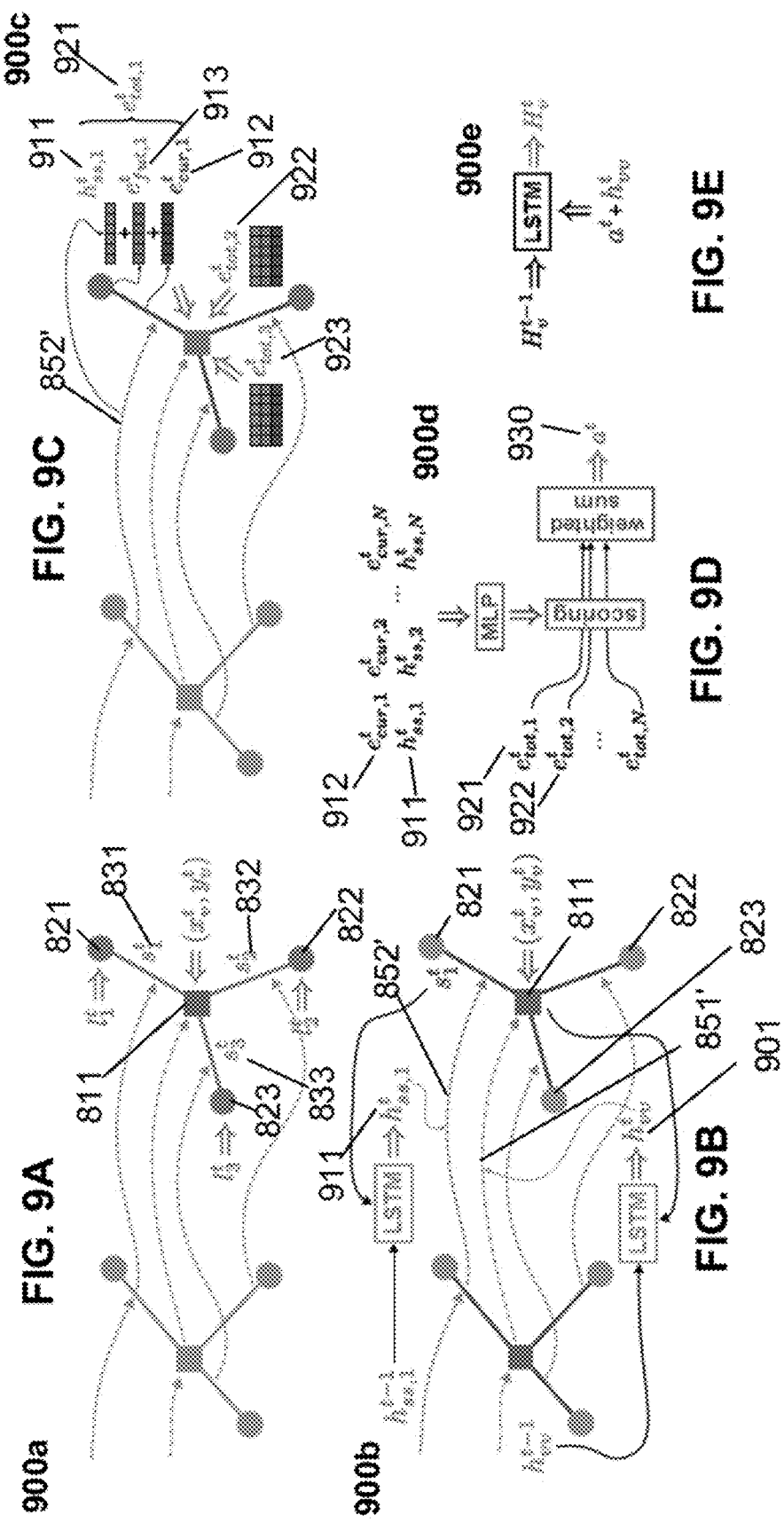

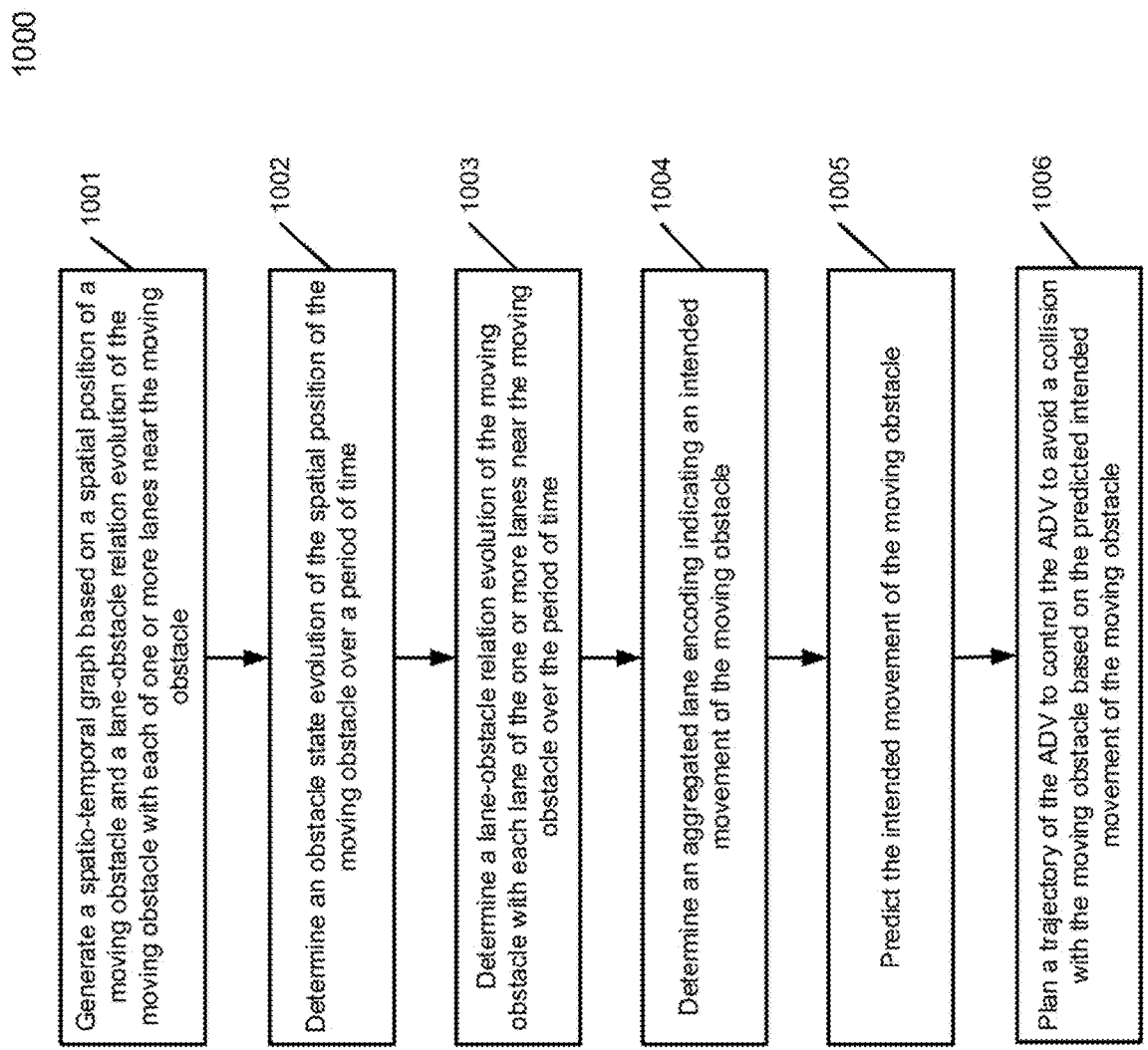

LANE-ATTENTION: PREDICTING VEHICLES' MOVING TRAJECTORIES BY LEARNING THEIR ATTENTION OVER LANES

TECHNICAL FIELD

Embodiments of the present disclosure relate generally to operating autonomous vehicles. More particularly, embodiments of the disclosure relate to predicting moving obstacles' movements or trajectories.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In planning a path or trajectory for an autonomous driving vehicle (ADV), it is important to predict a movement or trajectory of each moving obstacle within a proximity of the ADV. However, such a prediction is difficult to achieve high accuracy. For example, a moving obstacle's trajectory may be determined by an intention of the driver of the moving obstacle, which be affected by surrounding static environment, such as landscapes, lanelines, and road shapes in the vicinity of the moving obstacle. Thus, the intention of the driver of the moving obstacle may be hard to estimate.

BRIEF DESCRIPTION OF THE DRAWINGS

Embodiments of the disclosure are illustrated by way of example and not limitation in the figures of the accompanying drawings in which like references indicate similar elements.

FIGS. 9A-9E illustrate details of the example of the method of predicting the trajectory of the moving obstacle. FIG. 9A illustrates reception of new information; FIG. 9B illustrates temporal evolution; FIG. 9C illustrates spatial aggregation; FIG. 9D illustrates lane attention; and FIG. 9E illustrates updating of an overall state of the moving obstacle.

FIG. 10 is a flow diagram illustrating a process of predicting a trajectory of a moving obstacle according to one embodiment.

DETAILED DESCRIPTION

Figure 1:
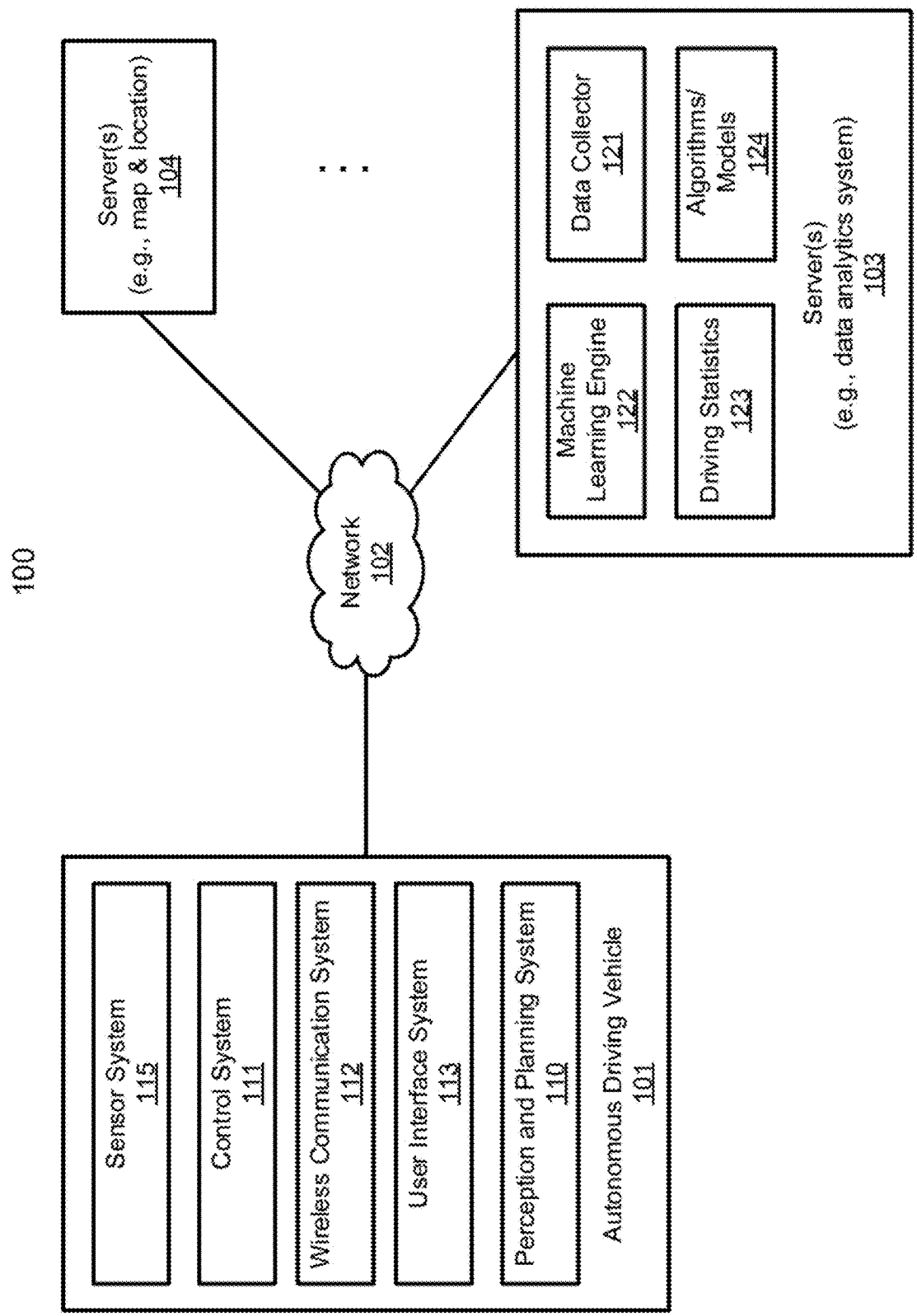
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a relation between a driver's intention and a moving obstacle's changing positions relative to road infrastructures is learned by leveraging attention mechanisms along with a long short-term memory (LSTM) network. The relationship is used to guide a prediction of an intended movement of the moving obstacle. For example, on-road lanes may be treated as non-Euclidean structures, and the moving obstacle's moving history may be unfolded to form a spatiotemporal graph. The intended movement of the moving obstacle may be predicted based on Graph Neural Networks. It is advantageous to process static environmental features around a predicted object by using non-Euclidean methods. The practicability and interpretability analysis of the method disclosed herein shows great potential for large-scale deployment in various autonomous driving systems.

According to one embodiment, a computer-implemented method for operating an ADV is disclosed. An obstacle state evolution of a spatial position of a moving obstacle over a period of time is determined. A lane-obstacle relation evolution of the moving obstacle with each of one or more lanes near the moving obstacle over the period of time is further determined. An intended movement of the moving obstacle is predicted based on the obstacle state evolution and the lane-obstacle evolution. Thereafter, a trajectory of the ADV is planned to control the ADV to avoid a collision with the moving obstacle based on the predicted intended movement of the moving obstacle. The above process is iteratively performed for each of the moving obstacles detected within a predetermined proximity of the ADV.

In one embodiment, a spatiotemporal graph may be generated based on the spatial position of the moving obstacle and the lane-obstacle relation evolution of the moving obstacle with each of the one or more lanes. The spatiotemporal graph may comprise two types of nodes, a set of spatial edges and two types of temporal edges. The two types of nodes may comprise an obstacle node represents the spatial position of the moving obstacle at a given time, and a corresponding lane node represents each of the plurality of lanes at the given time. For example, each of the set of spatial edges may indicate a corresponding pair-wise relationship between the obstacle node and the corresponding lane node. For example, the two types of temporal edges may comprise the obstacle state evolution of the spatial position of the moving obstacle over the period of time, and the lane-obstacle relation evolution of the moving obstacle with each of the one or more lanes over the period of time.

In one embodiment, the obstacle state evolution of the spatial position of the moving obstacle over the period of time is determined by using the LSTM network including a multi-layer perceptron (MLP) network. In one embodiment, the lane-obstacle relation evolution of the moving obstacle to each of the one or more lanes over the period of time is determined by using the LSTM network including the MLP network.

In one embodiment, an aggregated lane encoding indicating the intended movement of the moving obstacle is determined, where the intended movement of the moving obstacle is predicted further based on the aggregated lane encoding. In one embodiment, for each of the one or more lanes, a lane encoding is determined based on the lane-obstacle relation evolution of the moving obstacle with the lane, a current relative position of the lane to the moving obstacle, and a future shape of the lane. In one embodiment, for each of the one or more lanes, an attention score of the lane is determined based on the lane-obstacle relation evolution of the moving obstacle with the lane and a current relative position of the lane to the moving obstacle. In one embodiment, the aggregated lane encoding is based on a weighted sum of the lane encoding for each of the one or more lanes, wherein a weight for each of the one or more lanes is based on the attention score of the lane.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
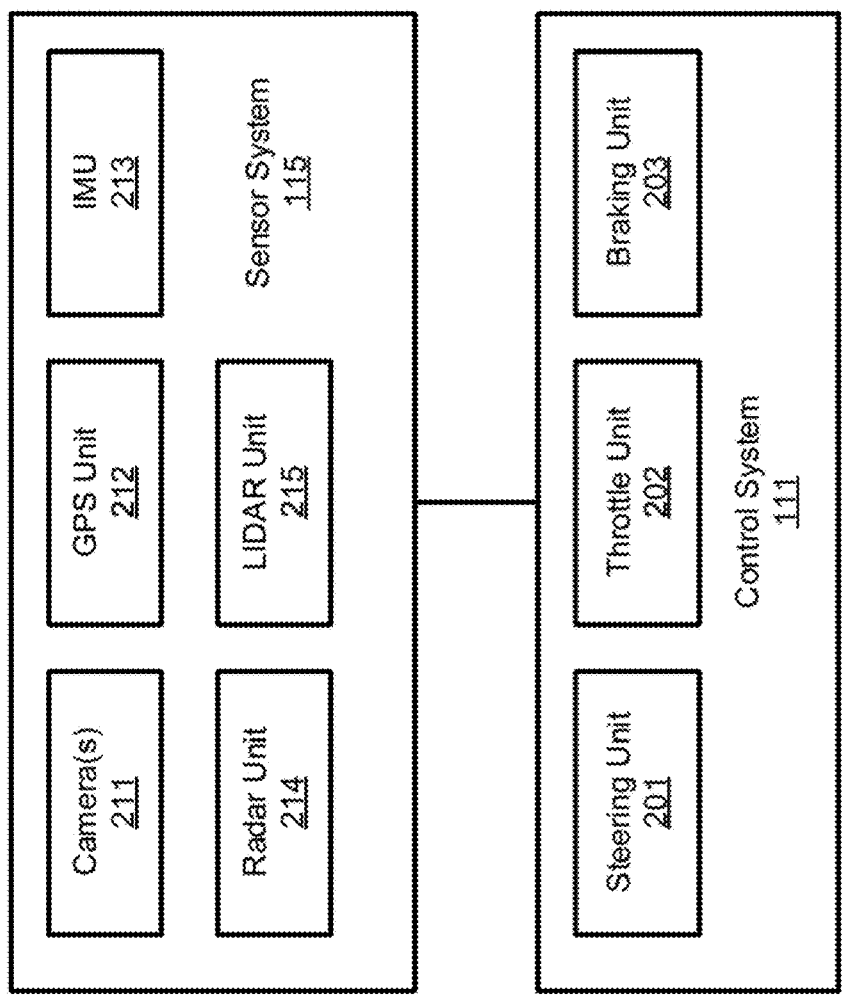
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to determine an obstacle state evolution of a spatial position of a moving obstacle over a period of time, an algorithm to determine a lane-obstacle relation evolution of the moving obstacle with each of one or more lanes near the moving obstacle over the period of time, and/or an algorithm or predictive model to predict an intended movement of the moving obstacle based on the obstacle state evolution and the lane-obstacle evolution, which will be described in details further below. Algorithms 124 can then be uploaded on ADVs to be utilized during autonomous driving in real-time.

Figure 3A:
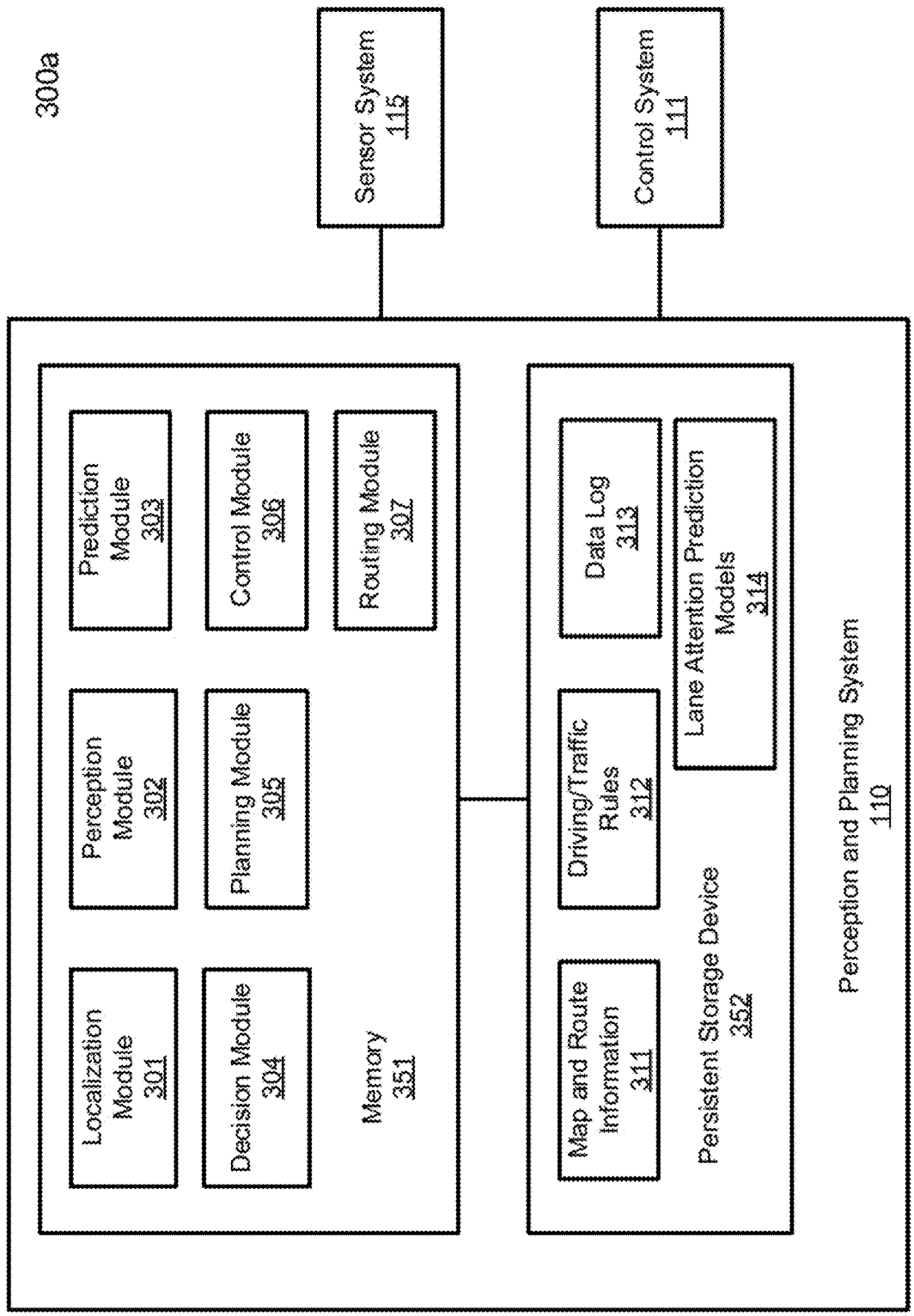
FIGS. 3A-3B are block diagrams illustrating an example of a perception and planning system used with an autonomous vehicle according to one embodiment.
Figure 3B:
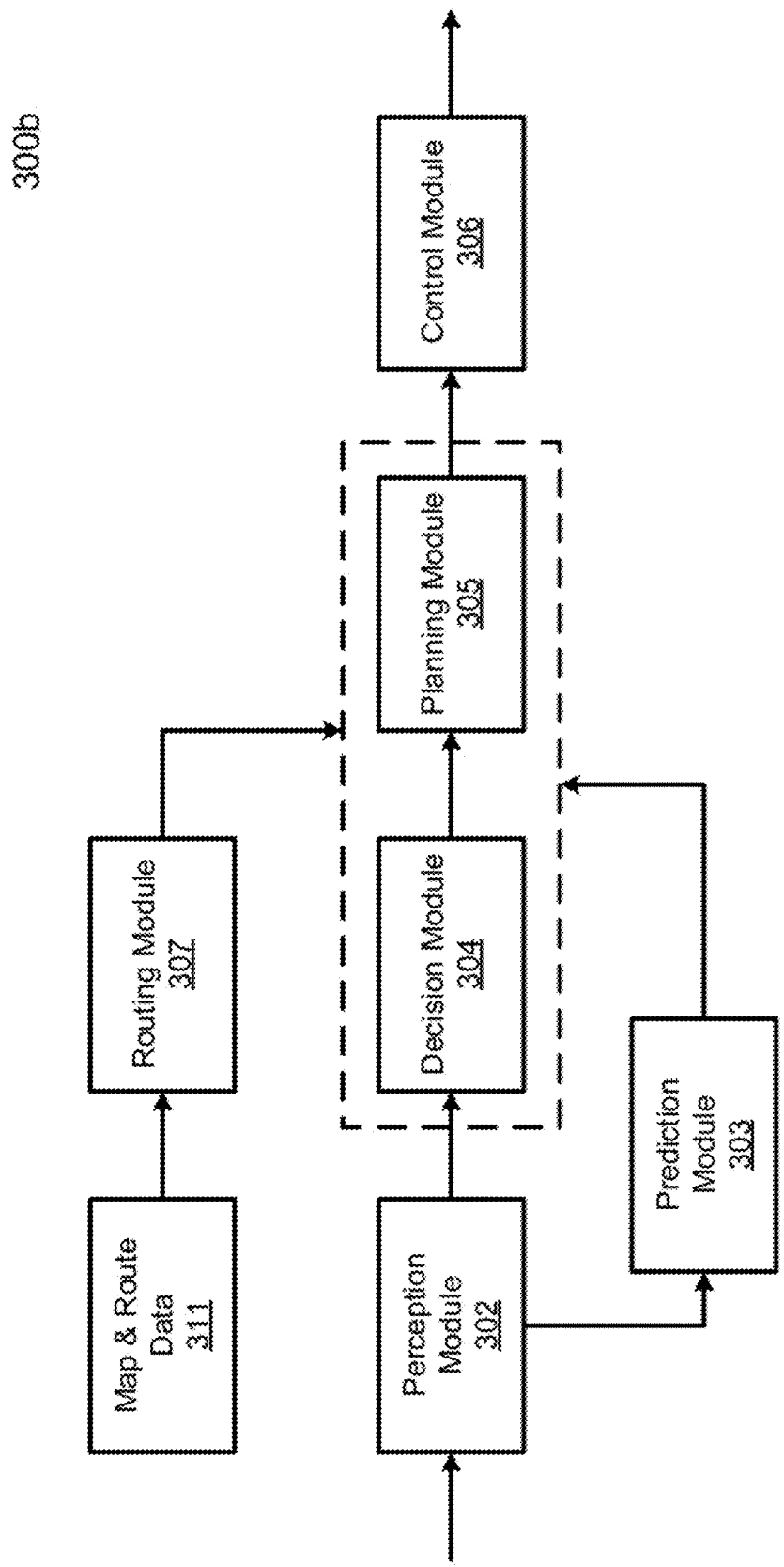

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Although not shown, perception and planning system 110 further includes a data logger or data collector configured to collect data processed by the components 301-307 and sensors over a period of time, which may be stored as a part of data log 313. For example, data log 313 includes any prediction, decision, and paths planned or made in each of the driving/planning cycle. Data log 313 may further include control commands issued and the responses or states (e.g., speed, acceleration, heading, locations, etc.) of the vehicle captured at different points in time during each driving cycle. Data log 313 may further include moving obstacles perceived over a period of time and their behaviors (e.g., prior locations, speed, headings captured during past cycles, etc.). Data log 313 may be utilized for planning and controlling the vehicle subsequently or alternatively, data log 313 may be analyzed offline for improving the driving algorithms or predictive models.

According to one embodiment, prediction module 303 is configured to identify a moving obstacle based on perception information provided by perception module 302. For each moving obstacle of the moving obstacles within a proximity of the ADV, prediction module 303 predicts an intended movement of the moving obstacle based on an obstacle state evolution and a lane-obstacle evolution based on a set of lane attention prediction rules or models 314.

Figure 4:
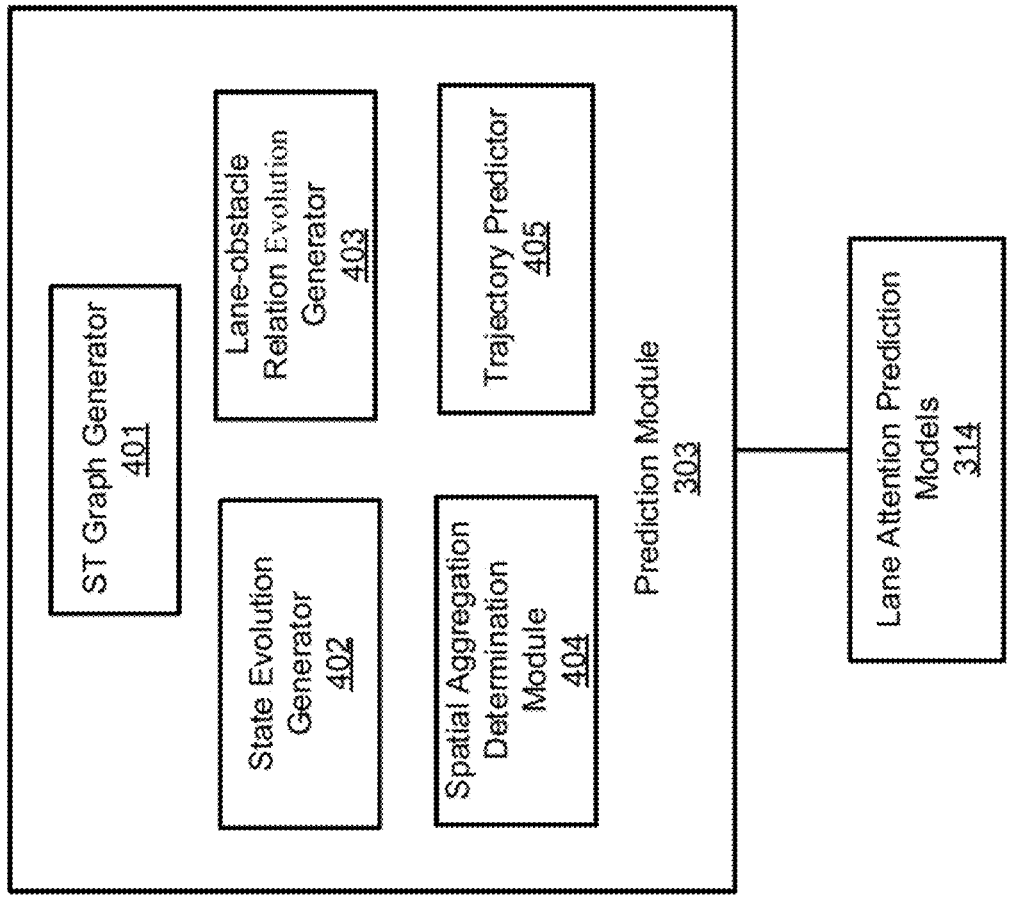
FIG. 4 is a block diagram illustrating an example of a prediction module according to one embodiment.
Figure 5:
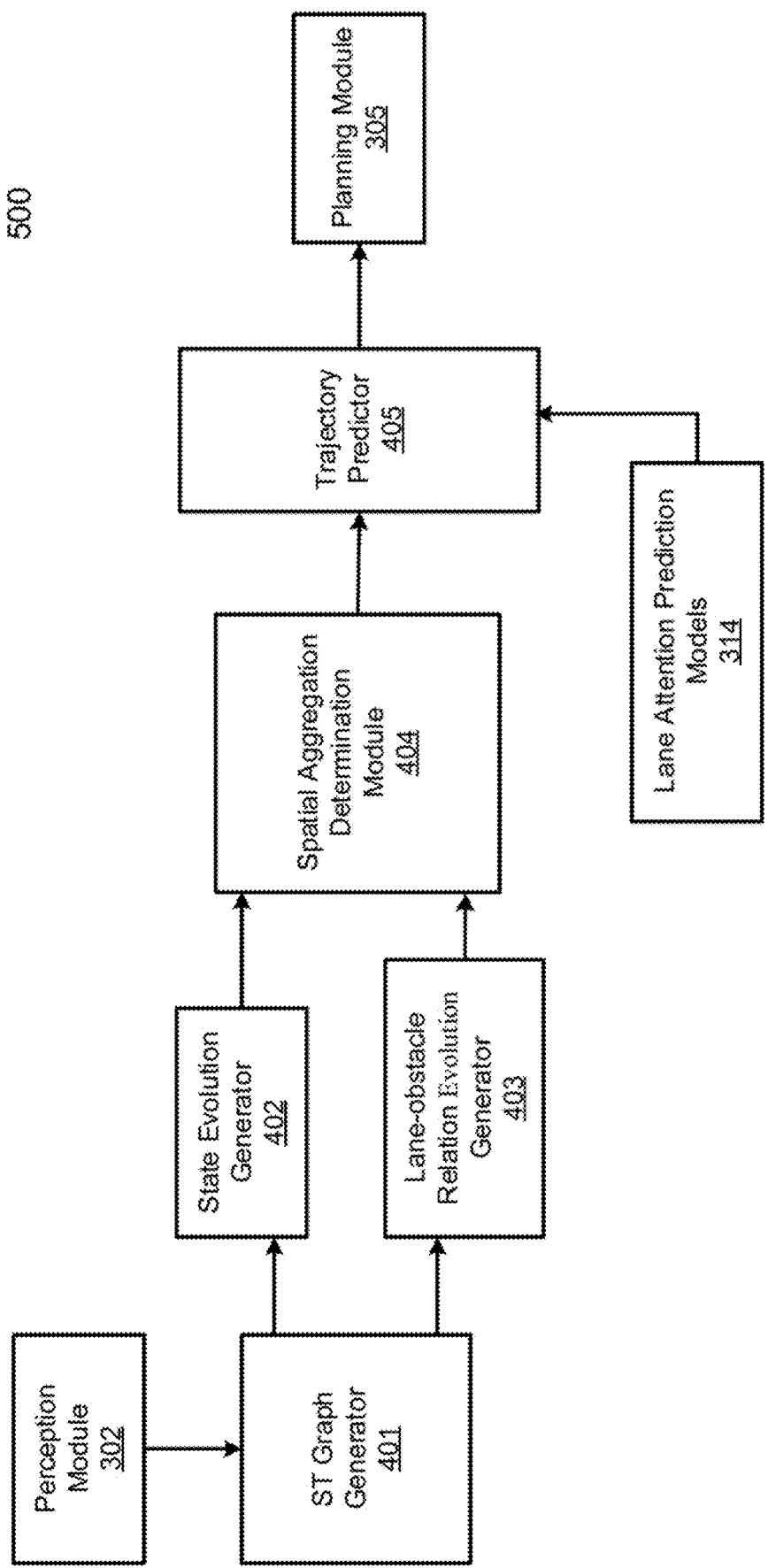
FIG. 5 is a processing flow diagram illustrating an example of a prediction module according to one embodiment.

FIG. 4 is a block diagram illustrating an example of a prediction module and FIG. 5 is a processing flow diagram of a prediction module according to one embodiment. Referring to FIG. 4 and FIG. 5, prediction module 303 includes, but is not limited to, spatiotemporal (ST) graph generator 401, state evolution generator 402, lane-obstacle relation evolution generator 403, spatial aggregation determination module 404, and trajectory predictor 404, which work together using lane attention prediction algorithms or models 314 to determine or predict an intended movement of a moving obstacle based on the obstacle state evolution and the lane-obstacle evolution. Note that modules 401-405 may be integrated into fewer number of modules or a single module. A moving obstacle can be a vehicle, a pedestrian, a bicycle, or any other objects that are capable of moving.

According to one embodiment, the moving obstacle and one or more lanes around the moving obstacle within a proximity of an ADV may be identified. The moving obstacle may be a vehicle, motorcycle, bicycle, or pedestrian. The moving obstacle and the one or more lanes around the moving obstacle may be identified as a part of perception process performed by the perception module 302 based on sensor data obtained from various sensors mounted on the ADV such as the sensors as shown in FIG. 2. In one embodiment, based on the perception information, an ST graph generator 401 is configured to generate an ST graph based on a spatial position of the moving obstacle and a lane-obstacle relation evolution of the moving obstacle with each of the one or more lanes. The state evolution generator 402 is configured to determine an obstacle state evolution of the spatial position of the moving obstacle over a period of time, and the lane-obstacle relation evolution generator 403 is configured to determine the lane-obstacle relation evolution of the moving obstacle with each of the one or more lanes near the moving obstacle over the period of time. The trajectory predictor 405 is configured to predict an intended movement of the moving obstacle based on the obstacle state evolution and the lane-obstacle evolution. Thereafter, the planning module 305 is configured to plan a trajectory of the ADV to control the ADV to avoid a collision with the moving obstacle based on the predicted intended movement of the moving obstacle.

In one embodiment, the spatial aggregation determination module 404 is configured to determine an aggregated lane encoding indicating the intended movement of the moving obstacle, where the intended movement of the moving obstacle is predicted further based on the aggregated lane encoding. In one embodiment, for each of the one or more lanes, the spatial aggregation determination module 404 is configured to determine a lane encoding based on the lane-obstacle relation evolution of the moving obstacle with the lane, a current relative position of the lane to the moving obstacle, and a future shape of the lane. In one embodiment, for each of the one or more lanes, the spatial aggregation determination module 404 is configured to determine an attention score of the lane based on the lane-obstacle relation evolution of the moving obstacle with the lane and a current relative position of the lane to the moving obstacle. The spatial aggregation determination module 404 is configured to determine the aggregated lane encoding based on a weighted sum of the lane encoding for each of the one or more lanes, wherein a weight for each of the one or more lanes is based on the attention score of the lane.

In one embodiment, the lane attention prediction algorithms or models 314 may be based on a long short-term memory (LSTM) network and a multi-layer perceptron (MLP) network. For example, the obstacle state evolution of the spatial position of the moving obstacle over the period of time may be determined by using an LSTM network and an MLP network; the lane-obstacle relation evolution of the moving obstacle to each of the one or more lanes over the period of time may be determined by using another LSTM network and another MLP network.

Figure 6:
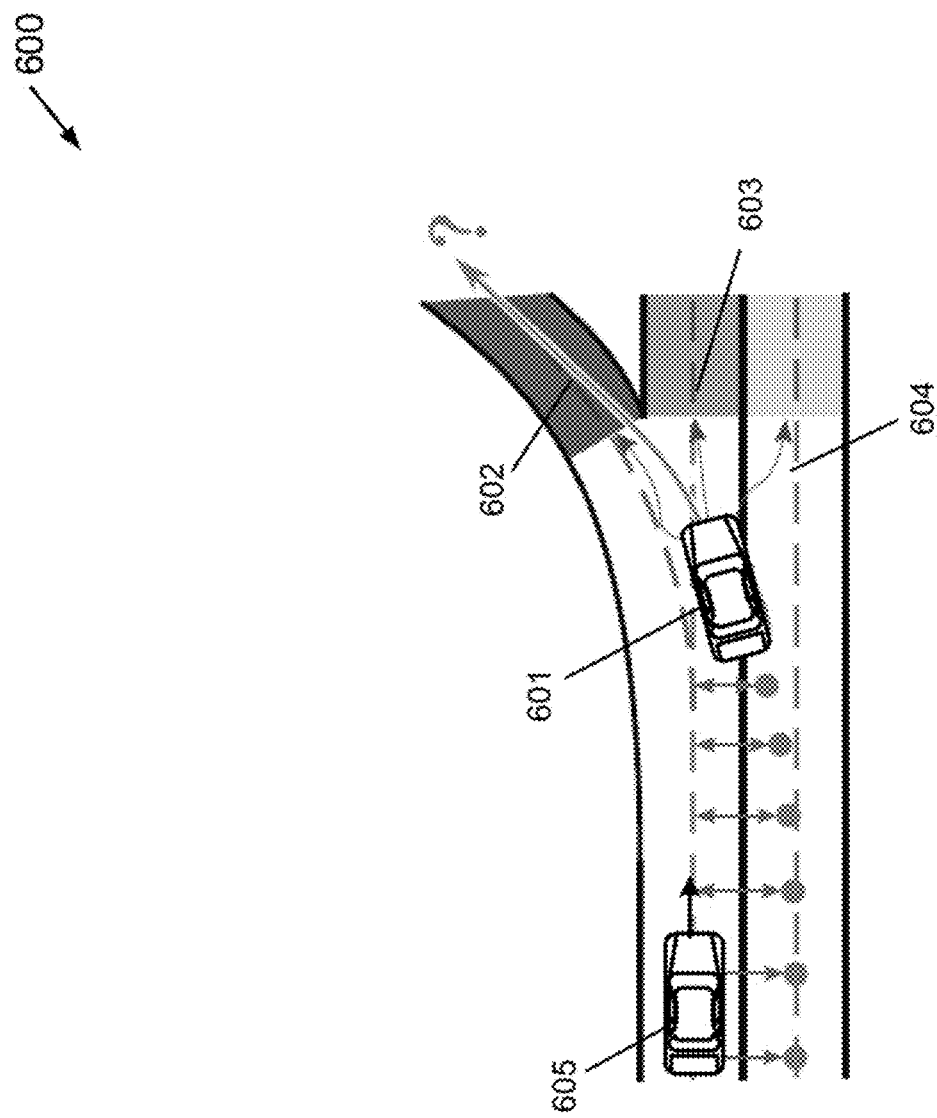
FIG. 6 shows an example of a problem to predict a trajectory of a moving obstacle near an exit.

FIG. 6 is a diagram 600 illustrating an example of a problem to predict a trajectory of a moving obstacle 601 with one or more lanes, e.g., 602, 603, 604, around the moving obstacle 601. In this example, the moving obstacle 601 is moving in a particular direction with a particular speed near an exit, with the one more lanes, e.g., 602, 603, 604, near the moving obstacle 601. The moving obstacle 601 may be constrained to drive on one of the one more lanes, e.g., 602, 603, 604. When planning a path for an ADV 605, it is important to accurately predict which lane of the lanes (e.g., 602, 603, 604) the moving obstacle 601 will most likely take. Which lane the moving obstacle 601 will take may significantly affect how the ADV 605 will move to avoid a collision with the moving obstacle 601.

Figure 7A:
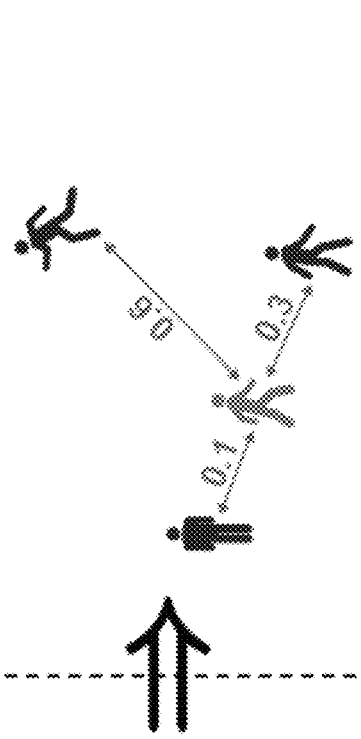
FIG. 7A illustrates an example of predicting a trajectory of a pedestrian based on dynamic interaction by a grid-like Euclidean method.

FIG. 7A is a diagram 700a illustrating an example of predicting a trajectory of a pedestrian based on dynamic interaction by a grid-like Euclidean method. The Euclidean method has been used to learn the dynamic interaction of pedestrians and using the dynamic interaction to guide the prediction of the trajectory of a pedestrian. For example, the Euclidean method has been used to forecast pedestrians' trajectories in crowded scenarios. In the Euclidean method, the space is divided into grids and applying occupancy grid pooling or social pooling. However, this method does not take an attention of the pedestrian into account. FIG. 7B is a diagram 700b illustrating an example of predicting a trajectory of a pedestrian based on dynamic interaction by a non-Euclidean method. The non-Euclidean method has been used to treated the objects and their interaction as a graph and used attention mechanisms to predict the trajectory of a pedestrian.

However, a moving obstacle' behaviors, may be constrained by lane information, as discussed in connection with FIG. 6, rather than by the moving obstacle's dynamics or the occasional interaction with other moving obstacles. Therefore, the impact of static environment may be dominant in determining a future moving trajectory of the moving obstacle.

Figure 7C:
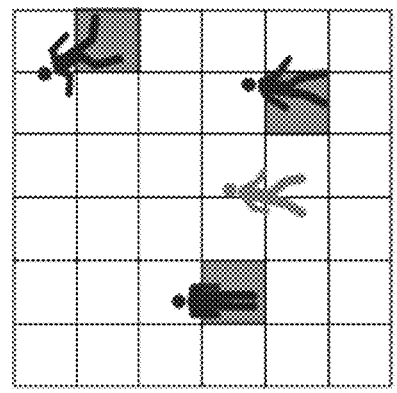
FIG. 7C illustrates an example of predicting a trajectory of a moving obstacle based on static environment by a grid-like Euclidean method.
Figure 7B:
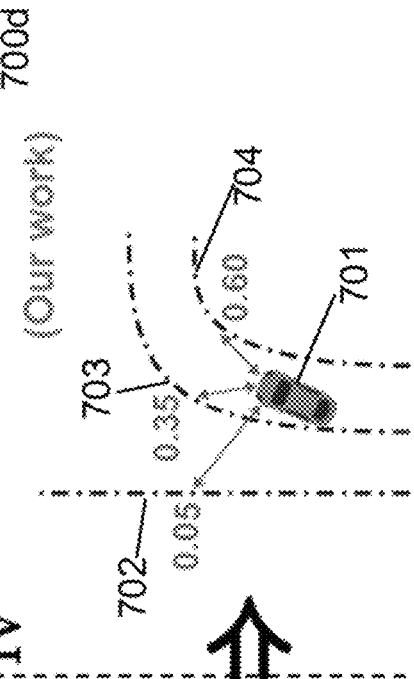
FIG. 7B illustrates an example of predicting a trajectory of a pedestrian based on dynamic interaction by a non-Euclidean method.

FIG. 7C is a diagram 700c illustrating an example of predicting a trajectory of a moving obstacle, e.g., a moving vehicle, based on static environment by a grid-like Euclidean method. The Euclidean method treats road infrastructures as Euclidean data (e.g., semantic map). However, the structure of lanes on roads may not be uniform. There can be any number of lanes around a moving obstacle, ranging from one to some great number (e.g. when entering a big intersection with many branches). Also, the shapes or directions of lanes may vary: on high-ways, lanes are mostly straight; whereas within intersections, lanes may branch into several completely different directions. While driving, drivers may have their attentions on one or a few of the lanes based on their intention for an intended movement. In some situations, the drivers may tend to follow the direction of the lanes. Because the Euclidean method does not consider the above factors, the Euclidean method may not be able to predict the trajectory of the moving obstacle accurately. There may be a need to develop a method or model to accurately predict a trajectory of the moving obstacle based on the intended movement of the moving obstacle.

Figure 7D:
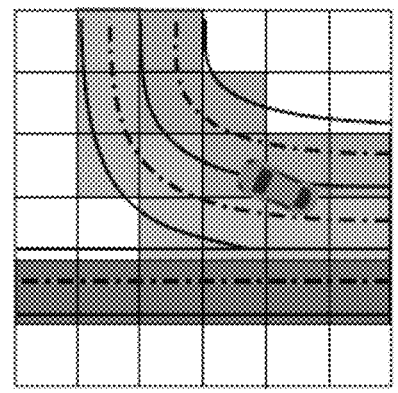
FIG. 7D illustrates an example of predicting a trajectory of a moving obstacle based on static environment according to one embodiment.

FIG. 7D is a diagram 700d illustrating an example of predicting a trajectory of a moving obstacle based on static environment according to one embodiment. The pairwise relations among a moving obstacle (e.g., 701) and its surrounding lanes (e.g., 702, 703, 704) play significant roles in predicting the moving obstacle's future movements. Thus, a method of predicting the trajectory of the moving obstacle may be based the information of the lanes (e.g., 702, 703, 704) and attention mechanisms to aggregate the static environmental information. In this method, the relation between the moving obstacle and the surrounding lanes may be learned. By understanding and modeling of the influence from surrounding environment, the method may accurately predict the trajectory or intended movement of the moving obstacles. In addition, the method may be applied to both high definition (HD) map and non-HD map based autonomous driving. In the HD map based autonomous driving, the lane information may be provided by pre-collected HD maps; in the non-HD map based autonomous driving, camera-detected lanes or pre-collected human driving paths may be used as the lane information. Furthermore, because learned attention scores may be visualized, the method may provide intuitive explanations of behaviors of the moving obstacle. This interpretability may also benefit other downstream modules of an autonomous driving system.

Figure 8:
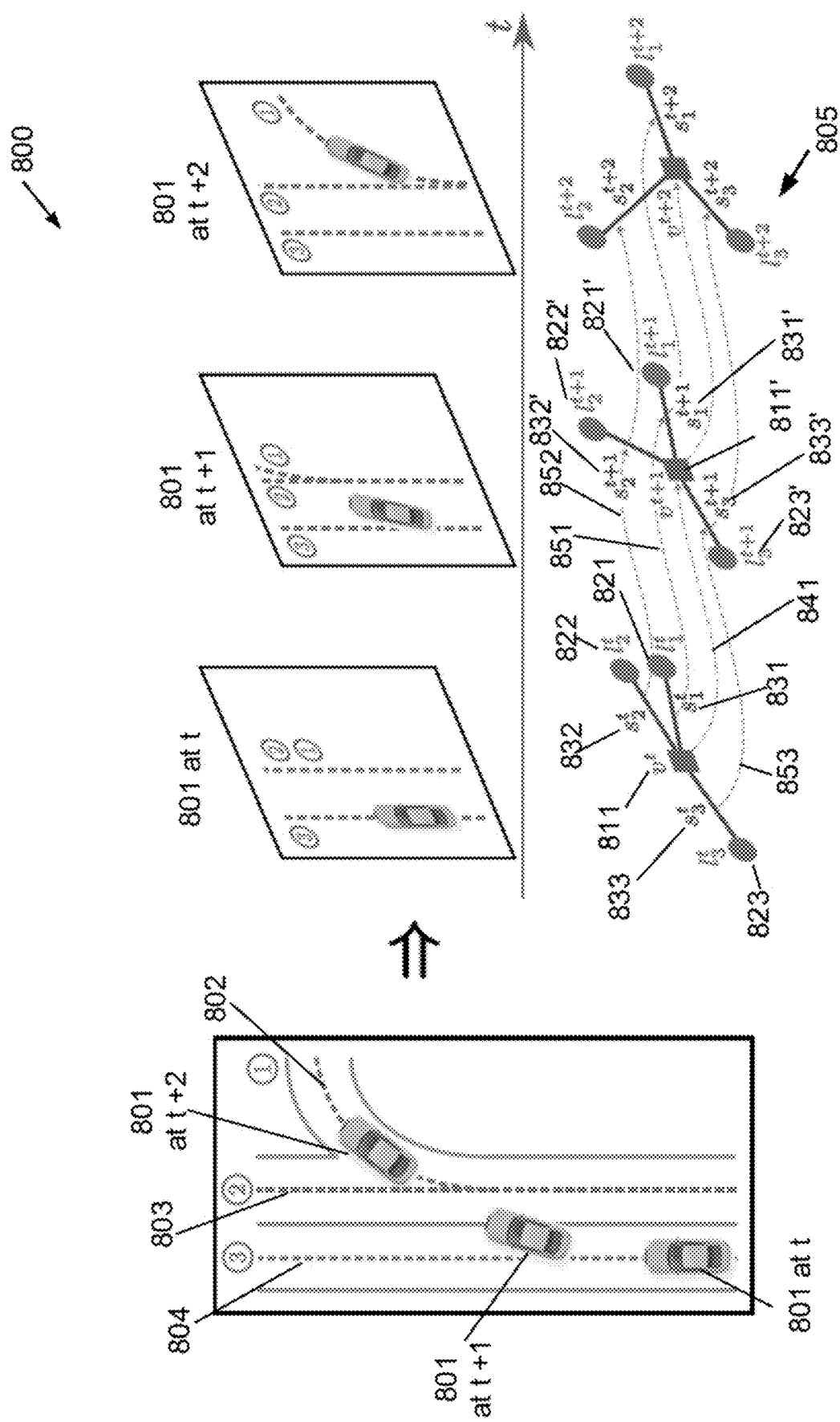
FIG. 8 illustrates an example of a method of predicting a trajectory of a moving obstacle according to one embodiment.

FIG. 8 is a diagram 800 illustrating an example of a method of predicting a trajectory of a moving obstacle 801 within a proximity of an ADV (not shown), where the moving obstacle 801 may be near one or more lanes 802, 803, 804. In one embodiment, the method may predict the trajectory of the moving obstacle 801 by formulating an ST graph 805 to unfold a history of the moving obstacle's motion on the one or more lanes 802, 803, 804. The moving obstacle 801 may be a moving vehicle, for example. The one or more lanes 802, 803, 804 may be near an exit, as shown in FIG. 8.

In this method, each moving obstacle's historical positions from a prior time $-T_{obs}$, to a current time-step t=0 may be received by sensors of a perception module of the ADV, at increments of $\Delta t$, a sampling period of the sensors. It may be assumed that at each time-step, moving obstacle's surrounding lanes are given, and the number of lanes is denoted as N. By this method, each vehicle's future positions over a time-span of $T_{pred}$, which may be an integer multiple of $\Delta t$, may be predicted. For example, a future position of the moving obstacle 801 over a time-span of $T_{pred}$ may be predicted by using this method.

The static environment of the moving obstacle 801 may be modeled by using Graph Neural Networks (GNN). the ST graph 805 based on GNN may be generated to clearly manifest pairwise relations between the moving obstacle 801 and the one or more lanes 802, 803, 804. GNN are connectionist models that capture the dependence of graphs via message passing between the nodes of graphs. Unlike standard neural networks, GNN may retain a state that can represent information from a neighborhood with arbitrary depth. GNN is effective in handling non-Euclidean inputs or excavating the pairwise relation properties out of input data. The Spatiotemporal Graph Neural Networks (ST-GNN), a derivative of GNN, use nodes to represent entities and two kinds of edges to represent temporal and spatial relations.

As illustrated in FIG. 8, for the moving obstacle 801, the ST graph 805 may be generated: G=(v; $\varepsilon_T$; $\varepsilon_S$), where v is a set of nodes, $\varepsilon_T$ is a set of temporal edges, and $\varepsilon_S$ is a set of spatial edges, as described in Equations (1) and (2) below:

$$V=\{v^t, l_i^t\}, \text{ and } \varepsilon S=\{s_i^t\}, \text{ where } s_i^t=(v^t, l_i^t), \forall t \in [-T_{obs}/\Delta t, T_{pred}/\Delta t] \text{ and } \forall i \in [1, N], \quad (1)$$

$$\varepsilon_T = \{(s_i^t, s_i^{t+1}), (v^t, v^{t+1})\}, \forall t \in [-T_{obs}/\Delta t, T_{pred}/\Delta t-1] \text{ and } \forall i \in [1, N]. \quad (2)$$

As shown in Equation (1), the set of nodes v contains two kinds of nodes: obstacle nodes and lane nodes. For example, an obstacle node $v^t$ 811 represents the moving obstacle 801 at a given time t, and a lane node $l_i^t$ (e.g., 821, 822, 823) represents one of the local lanes (e.g., 802, 803, 804) around the moving obstacle 801 at the time t; an obstacle node $v^{t+1}$ 811' represents the moving obstacle 801 at a time-step t+1, and a lane node $l_i^{t+1}$ (e.g., 821', 822', 823') represents one of the local lanes (e.g., 802, 803, 804) around the moving obstacle at the time-step t+1 . . . so on and so forth.

The set of spatial edges $\varepsilon_S$ (e.g., $s_1^t$ 831, $s_2^t$ 832, $s_3^t$ 833) may be formed based on the pair-wise relations between the obstacle node $v^t$ 811 and the lane node $l_i^t$ (e.g., 821, 822, 823) at the same time t. As shown in FIG. 8, at the given time t, connecting lines $s_1^t$ 831, $s_2^t$ 832, and $s_3^t$ 833 represent the spatial edges between the obstacle node $v^t$ 811 and the lane nodes $l_1^t$ 821, $l_2^t$ 822, and 823, respectively. At the time-step t+1, connecting lines $s_1^{t+1}$ 831', $s_2^{t+1}$ 832', and $s_3^{t+1}$ 833' represent the spatial edges between the obstacle node $v^{t+1}$ 811' and the lane nodes $l_1^{t+1}$ 821', $l_2^{t+1}$ 822', and $l_3^{t+1}$ 823,' respectively.

As shown in Equation (2), there are two types of temporal edges, one type temporal edge about the obstacle's state evolution and the other type temporal edge about the evolution of lane-obstacle relationship over time. For example, a temporal edge 841 connecting the obstacle node $v^t$ 811 and the obstacle node $v^{t+1}$ 811' represents the obstacle's state evolution. Temporal edges (e.g., 851, 852, 853) between the set of spatial edges $\varepsilon_S$ (e.g., $s_1^t$ 831, $s_2^t$ 832, $s_3^t$ 833) at the given time t and the set of spatial edges $\varepsilon_S$ (e.g., $s_1^{t+1}$ 831', $s_2^{t+1}$ 832', $s_3^{t+1}$ 833') at the time-step t+1 may represent the evolution of lane-obstacle relationship over time. The movement history of moving obstacle 801, as well as its changing relation with the surrounding lanes 802, 803, 804, may be unrolled over time to form the ST-graph 805, as illustrated in FIG. 8.

FIGS. 9A-9E illustrate details of the example of the method in FIG. 8 to predict the trajectory of the moving obstacle 801 in the proximity of the ADV. FIG. 9A is a diagram 900a illustrating a step of reception of new information of the moving obstacle 801. Referring to FIG. 8 and FIG. 9A, the spatial position of the moving obstacle 801 may be received at every instant time. The lane information about the one or more lanes (e.g., 802, 803, 804) near the moving obstacle 801 may also be received at every time instant. For example, at every instant time, the obstacle node $v^t$ 811 may receive the moving obstacle 801's new spatial position ($x_v^t$, $y_v^t$), and the lane nodes $l_i^t$ (e.g., 821, 822, 823) may also be refreshed to reflect lanes (e.g., 802, 803, 804) in the moving obstacle 801's current neighborhood. The lane nodes $l_i^t$ (e.g., 821, 822, 823) may contain a set of ordered lane-points. The lane information about the lanes (e.g., 802, 803, 804) may come directly from the sensors of the perception module of the ADV. Alternatively, the information about the lanes (e.g., 802, 803, 804) may be derived by first localizing a position of the moving obstacle 801, and then fetching the information about the lanes (e.g., 802, 803, 804) around the moving obstacle 801 from a pre-collected HD map. Thus, all the spatial edges $s_i^t \in \varepsilon_s$ (e.g., $s_1^t$ 831, $s_2^t$ 832, $s_3^t$ 833) of this instant time are then readily updated with the new spatial relation of the moving obstacle 801 to the local lanes (e.g., 802, 803, 804) near the moving obstacle.

FIG. 9B is a diagram 900b illustrating steps of temporal evolution of the method for predicting the trajectory of the moving obstacle 801. For example, temporal evolution may include an obstacle state evolution of the spatial position of the moving obstacle 801 and a lane-obstacle relation evolution of the moving obstacle 801 with each of the one or more lanes (e.g., 802, 803, 804) near the moving obstacle 801 over the period of time. For example, the method may update a temporal edge 851' representing the obstacle state evolution of the moving obstacle 801 and a set of temporal edges (e.g., 852') representing the lane-obstacle relation evolutions of the moving obstacle 801 with the one or more lanes (e.g., 802, 803, 804).

In one embodiment, the obstacle state evolution may be determined by using Long Short-Term Memory networks (LSTM). LSTM is an artificial recurrent neural network (RNN) architecture used in the field of deep learning. Unlike standard feedforward neural networks, LSTM has feedback connections. LSTM can process not only single data points, but also entire sequences of data. LSTM may be applied in learning the patterns of sequential data. For example, the LSTM network can be described by the following equations:

$$f_t = \sigma(W_f x_t + U_f h_{t-1} + b_f),  \quad (3)$$

$$i_t = \sigma(W_i x_t + U_i h_{t-1} + b_i),  \quad (4)$$

$$o_t = \sigma(W_o x_t + U_o h_{t-1} + b_o),  \quad (5)$$

$$c_t = f_t \odot c_{t-1} + i_t \odot \tan h(W_c x_t + U_c h_{t-1} + b_c),  \quad (6)$$

$$h_t, o_t \odot \tan h(c_t),  \quad (7)$$

In the above equations, $f_t$, $i_t$, $o_t$, and $c_t$ stand for forget gate, update gate, output gate, and cell state, respectively, $h_t$ is the hidden state and may contain encoded patterns of the sequential inputs. The following equation (8) may be used as the abbreviation of equations (3)-(7):

$$h_t = \text{LSTM}(h_{t-1}, x_t; \Theta)  \quad (8)$$

An obstacle's movement is a form of sequential data, and the movement may be in part governed by, especially in short term, kinematics and vehicle dynamics. For example, a vehicle can't complete a sharp turn instantaneously; nor can the vehicle slow down from 60 mph to 0 in a blink. Therefore, the LSTM network may be used to learn this underlying driving force. For example, the LSTM network may first embed a relative displacement of the spatial position of the moving obstacle 801 using a Multi-Layer Perceptron (MLP) network, as described in equation (9) below. MLP network is a class of feedforward artificial neural network. MLP network may include at least three layers of nodes: an input layer, a hidden layer and an output layer. MLP may utilize a supervised learning technique called backpropagation for training. Next, the embedding and the previous hidden state may be used as inputs to update the new hidden state 901 for the temporal edge 851' ($v_{t-1}$, $v^t$) as described in equation (10) below.

$$e_{vv}^t = \text{MLP}((x_v^t - x_v^{t-1}, y_v^t - y_v^{t-1}); W_{vv}),  \quad (9)$$

$$h_{vv}^t = \text{LSTM}(h_{vv}^{t-1}, e_{vv}^t, \Theta_{vv}),  \quad (10)$$

The lane-obstacle relation evolution of the moving obstacle 801 may be determined by using another LSTM network. The obstacle's movement may be determined by the driver's intention. The driver's intention may be often not expressed explicitly, but can be inferred based on the obstacle's changing relation with each lane because the driver tend to follow one or a few lanes to stay courteous and to avoid accidents. Thus, the lane-obstacle relation evolution of the moving obstacle 801 with each of one or more lanes (e.g., 802, 803, 804) over the period of time may be determined by using the another LSTM network.

Referring to FIG. 8 and FIG. 9B, with the moving obstacle 801's spatial position ($x_v^t$, $y_v^t$) 811 and the updated local lane information $l_i^t$ (e.g., 821, 822, 823), the moving obstacle 801's location onto each lane (e.g., 802, 803, or 804) may be projected to get a projection point ($x_p^t$, i, $y_{p,i}^t$). Then, the difference between projection points and the moving obstacle 801's position may be determined, and MLP may be used to embed this vector, as described in equation (11) below. Next, as shown in equation (12) below, this embedding and the previous hidden state may be used to update an encoding $h_{ss,i}^t$ (e.g., 911), which corresponds to the temporal edge ($s_i^{t-1}$; $s_i^t$) (e.g., 852') connecting sequential lane-vehicle relation pairs.

$$e_{ss,i}^t = \text{MLP}((x_{p,i}^t - x_v^t, y_{p,i}^t - y_v^t); W_{ss}),  \quad (11)$$

$$h_{ss,i}^t = \text{LSTM}(h_{ss,i}^{t-1}, e_{ss,i}^t, \Theta_{ss}),  \quad (12)$$

As shown in Equations (11) and (12), the encoding $h_{ss,i}^t$ (e.g., 911) contains the learned evolving relation between the moving obstacle 801 and the ith lane of the one or more lanes (e.g., 802, 803, 804). For example, an encoding $h_{ss,i}^t$ 911 contains the learned evolving relation between the moving obstacle 801 and the first lane 802, as illustrated in FIG. 9B.

FIG. 9C is a diagram 900c illustrating steps of spatial aggregation of the method to predict the trajectory for the moving obstacle 801. Spatial aggregation refers to an aggregation of information about the obstacle state of the moving obstacle 801 and the lane information about all lanes (e.g., 802, 803, 804) to infer the intention of the driver of the moving obstacle 801 in order to accurately predict the further trajectory of the moving obstacle 801. As discussed above, for each lane, the encoding $h_{ss,i}^t$ (e.g., 911) of the historical evolving relation of the lane with the moving obstacle 801 may be determined by using the LSTM network. Next, a current relative position of each lane to the moving obstacle 801 and a future shape of each lane may be determined, each using an MLP network respectively, for example, as described by the equations (13) and (14) below:

$$e_{cur,i}^t = \text{MLP}((x_{p,i}^t - x_v^t, y_{p,i}^t - y_v^t); W_{cur}), \quad (13)$$

$$e_{fut,i}^t = \text{MLP}(l_i^t; W_{fut}), \quad (14)$$

The encoding $h_{ss,i}^t$ for each lane, the current relative position $e_{cur,i}^t$ for each lane, and the future shape $e_{cur,i}^t$ for each lane may be concatenated together to form an overall encoding $e_{tot,i}^t$ for each lane at the given time t:

$$e_{tot,i}^t = \text{concentrate}(h_{ss,i}^t, e_{cur,i}^t, e_{fut,i}^t). \quad (15)$$

For example, as illustrated in FIG. 8 and FIG. 9C, for the first lane 802, an encoding $h_{ss,1}^t$ 911, a current relative position $e_{cur,1}^t$ 912, and a future shape $e_{cur,1}^t$ 913 may be concatenated together to form an overall encoding $e_{tol,1}^t$ 921 at the given time t. Similarly, for the second lane 803, an overall encoding $e_{tol,2}^t$ 922 at the given time t may be formed; for the third lane 804, an overall encoding $e_{tol,3}^t$ 923 at the given time t may be formed.

In order to accurately predict the trajectory of the moving obstacle 801, the lane information of all the surrounding lanes (e.g., 802, 803, 804) need to be considered. To jointly reason across multiple lanes, the encodings of all lanes (e.g., 921, 922, 923) may be aggregated. This is a challenging task, because there may be variable number of lanes but the aggregated output should be compact and of fixed dimension. Also, different lanes may play different roles in determining the movement of the moving obstacle 801.

For example, a lane-pooling mechanism may be used to aggregate all the lanes. In the lane-pooling mechanism, a deciding factor may be based on a single lane. The single lane is a lane that is closest to the moving obstacle 801 and the lane may vary over time. At each time-step, an encoding of the lane that is closest to the moving obstacle 801 may be selected as a lane-pooling result. The selected encoding may be used as an aggregated encoding $a^t$:

$$i_{pooling} = \arg\min_i ((x_{p,i}^t - x_v^t)^2 + (y_{p,i}^t - y_u^t)^2), \quad (16)$$

$$a^t = e_{tot,i_{pooling}}^t. \quad (17)$$

However, the driver of the moving obstacle 801 may not only focus on the single lane while driving; the driver may rather pay attention to multiple lanes. Also, in some cases, such as in the middle of a lane-changing behavior, there may be an abrupt change in the lane-pooling result, which may introduce some negative impacts on the subsequent network modules.

FIG. 9D illustrates predicting the trajectory of the moving obstacle 801 based on a lane attention mechanism according to one embodiment. The lane attention mechanism may be used to resolve the above problem. The lane attention mechanism refers to a prediction algorithm or model that aggregates the encodings of all lanes based on an attention of the driver for each lane respectively. For example, the lane attention mechanism may be performed by a lane attention prediction models 314 of the ADV. In one embodiment, at first, an attention score for each lane may be computed based on the current relative position $e_{cur,i}^t$ for each lane and the encoding $h_{ss,i}^t$ of the historical evolving relation to the moving obstacle 801 for each lane, $$\text{score}(i,t) = \text{MLP}((\text{concentrate}(e_{cur,i}^t, h_{ss,i}^t)); W_{score}), \quad (18)$$

Referring to FIG. 9D, an attention score for the first lane may be computed based on the current relative position $e_{cur,1}^t$ 912 for the first lane and the encoding $h_{ss,1}^t$ 911 of the evolving relation to the moving obstacle 801 for the first lane. The attention score for each lane represents the attention of the driver for each lane, which corresponds to the likelihood that the moving obstacle may drive on the corresponding lane.

Then, the overall aggregated encoding $a^t$ 930 may be computed by taking a weighted sum of each lane's total encoding $e_{tot,i}^t$ from equation (15), with the weights being a normalized attention scores, as described in equation (19) below, $$a^t = \sum_{i=1}^{N} \frac{\exp(\text{score}(i, t))}{\sum_{j=1}^{N} \exp(\text{score}(j, t))} \cdot e_{tot,i}^t. \quad (19)$$

The resulting aggregated lane encoding $a^t$ 930, either based on the lane-pooling mechanism or the lane-attention mechanism, may be expected to contain a learned encoding of the intention of the driver of the moving obstacle 801. The resulting aggregated lane encoding $a^t$ 930 based on the lane-attention mechanism may accurately predict the intention of the driver by taking into account of the attentions of the driver for all the lanes.

FIG. 9E illustrates updating of an overall state of the moving obstacle 801. The aggregated lane encoding $a^t$ 930 and the previous encoding of obstacle's movement history may be combined and used to update the overall hidden-state corresponding to the obstacle node $v^t$:

$$e_v^t = \text{concentrate}(a^t, h_{vv}^t), \quad (20)$$

$$H_v^t = \text{LSTM}(H_v^{t-1}, e_v^t, \Theta_v), \quad (21)$$

As illustrated in FIG. 9E, the overall hidden-state $H_v^t$ may be updated at every time-step and may be used to infer the future trajectory of the moving obstacle 801.

When predicting the trajectory of the moving obstacle 801 at a time t, where the time $t \in [1, T_{pred}/\Delta t]$, each trajectory point may be assumed to follows a bi-variate Gaussian distribution, and the network may be trained to learn all parameters of the Gaussian distribution. Therefore, the hidden states $H_v^t$ of the obstacle node may be processed using an MLP with the last rectified linear units (ReLU) layer removed. A 5-dimensional vector for each trajectory point may be determined, which may contain values of the mean vector and covariance matrix, as described in the equation (22) below:

$$[\mu_x^t, \mu_y^t, \sigma_x^t, \sigma_y^t, \rho^t] = \text{MLP}(H_v^t; W_{pred}). \quad (22)$$

The expectation of the predicted distribution, $(\mu_x^t; \mu_y^t)$ may be used as a new spatial position of the moving obstacle 801 in place of $(x_v^t; y_v^t)$, to serve as an input to the LSTM of next cycle and infer the trajectory point of the next time-step. This process may be repeated until all the trajectory points up to $t = T_{pred}/\Delta t$ have been predicted.

For example, a negative log-likelihood may be used as a loss function and the network may be trained by minimizing this loss as described below in equation (23):

$$L = -\sum_{t=1}^{T_{pred}/\Delta t} \log(P(x_v^t, y_v^t \mid \mu_x^t, \mu_y^t, \sigma_x^t, \sigma_y^t, \rho^t)). \quad (23)$$

FIG. 10 is a flow diagram illustrating a process of predicting a trajectory of a moving obstacle according to one embodiment. Process 1000 may be performed by processing logic which may include software, hardware, or a combination thereof. For example, process 1000 may be performed by prediction module 303. Referring to FIG. 10, in operation 1001, processing logic may generate a spatiotemporal graph based on a spatial position of the moving obstacle and the lane-obstacle relation evolution of the moving obstacle with each of one or more lanes. In operation 1002, processing logic determines an obstacle state evolution of the spatial position of the moving obstacle over a period of time. In operation 1003, processing logic determines a lane-obstacle relation evolution of the moving obstacle with each lane of the one or more lanes near the moving obstacle over the period of time. In operation 1004, processing logic may determine an aggregated lane encoding indicating an intended movement of the moving obstacle. In operation 1005, processing logic predicts the intended movement of the moving obstacle based on the obstacle state evolution and the lane-obstacle evolution. In one embodiment, the intended movement of the moving obstacle may be predicted further based on the aggregated lane encoding. In operation 1006, processing logic plans a trajectory of the ADV to control the ADV to avoid a collision with the moving obstacle based on the predicted intended movement of the moving obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   determining, by a processor, an obstacle state evolution of a spatial position of a moving obstacle over a period of time determined by using a first multi-layer perceptron (MLP) network;
   determining, by the processor, a lane-obstacle relation evolution of the moving obstacle with each of one or more lanes near the moving obstacle over the period of time determined by using a second MLP network based on the moving obstacle's changing relation with each of the one or more lanes by using an aggregated lane encoding and an intended movement of the moving obstacle, including:
      determining the intended movement of the moving obstacle by using non-Euclidean methods based on that the moving obstacle tends to follow the one or more lanes based on a current position of each of the one or more lanes to the moving obstacle and a future shape of each of the one or more lanes based on an overall lane encoding formed from a concatenation by a lane encoding for each lane, a current relative position for each lane, and a subsequent shape for each lane, wherein the first MLP network and the second MLP network are different and include an input layer, a hidden layer and an output layer;
      determining an attention score for each lane based on the current relative position for each lane and the lane encoding for each lane; and determining the aggregated lane encoding based on each lane's overall lane encoding and each lane's attention score;

planning, by the processor, a trajectory of the ADV to control the ADV to avoid a collision with the moving obstacle based on the determined intended movement of the moving obstacle, the obstacle state evolution and the lane-obstacle evolution; and controlling, by the processor, the ADV to navigate based on the planned trajectory of the ADV.

2. The method of claim 1, further comprising generating a spatiotemporal graph based on the spatial position of the moving obstacle and the lane-obstacle relation evolution of the moving obstacle with each of the one or more lanes, wherein the spatiotemporal graph is generated by v, $\varepsilon_T$, and $\varepsilon_S$, where v is a set of nodes, $\varepsilon_T$ is a set of temporal edges, and $\varepsilon_S$ is a set of spatial edges.

3. The method of claim 2, wherein the spatiotemporal graph comprises a plurality of types of nodes, the set of spatial edges and a plurality of types of temporal edges.

4. The method of claim 3, wherein the types of nodes comprise an obstacle node representing the spatial position of the moving obstacle at a given time, and a corresponding lane node representing each of the one or more lanes at the given time.

5. The method of claim 4, wherein each of the set of spatial edges indicating a corresponding pair-wise relationship between the obstacle node and the corresponding lane node.

6. The method of claim 3, wherein the types of temporal edges comprise the obstacle state evolution of the spatial position of the moving obstacle over the period of time, and the lane-obstacle relation evolution of the moving obstacle with each of the one or more lanes over the period of time.

7. The method of claim 2, wherein the set of spatial edges $\varepsilon_S$ is formed based on a pair-wise relations between an obstacle node and a lane node at a same time, wherein the set of nodes v include obstacle nodes and lane nodes, and wherein the set of temporal edges $\varepsilon_T$ include the obstacle state evolution and the lane-obstacle evolution.

8. The method of claim 1, wherein the obstacle state evolution of the spatial position of the moving obstacle over the period of time is determined by using at least one of a long short-term memory (LSTM) network.

9. The method of claim 1, wherein the lane-obstacle relation evolution of the moving obstacle to each of the one or more lanes over the period of time is determined by using at least one of a long short-term memory (LSTM) network.

10. The method of claim 1, wherein the determined aggregated lane encoding indicates the intended movement of the moving obstacle, wherein the intended movement of the moving obstacle is predicted further based on the aggregated lane encoding.

11. The method of claim 10, further comprising, for each of the one or more lanes, determining the lane encoding based on the lane-obstacle relation evolution of the moving obstacle with the lane, the current relative position of the lane to the moving obstacle, and the subsequent shape of the lane.

12. The method of claim 11, further comprising, for each of the one or more lanes, determining the attention score of the lane based on the lane-obstacle relation evolution of the moving obstacle with the lane and the current relative position of the lane to the moving obstacle.

13. The method of claim 12, wherein the aggregated lane encoding is determined based on a weighted sum of the lane encoding for each of the one or more lanes, wherein a weight for each of the one or more lanes is based on the attention score of the lane.

14. The method of claim 1, wherein the overall lane encoding formed from the concatenation by the lane encoding for each lane, the current relative position for each lane, and the subsequent shape for each lane is determined by one or more equations including:

$$e_{tot,i}{}^t = \text{concentrate}(h_{ss,i}{}^t, e_{cur,i}{}^t, e_{fut,i}{}^t),$$

wherein $h^t_{ss,I}$ is the lane encoding for each lane, wherein $e^t_{cur,i}$ is the current relative position for each lane, and wherein $e^t_{cur,i}$ is the subsequent shape for each lane, and wherein $e^t_{tol,I}$ is the overall lane encoding.

15. The method of claim 1, wherein the attention score for each lane represents an attention of a driver for each lane corresponding to a likelihood that the moving obstacle may drive on the corresponding lane.

16. A non-transitory machine-readable medium having instructions stored therein, which when executed by a processor, cause the processor to perform operations of operating an autonomous driving vehicle (ADV), the operations comprising:

determining an obstacle state evolution of a spatial position of a moving obstacle over a period of time determined by using a first multi-layer perceptron (MLP) network;

determining a lane-obstacle relation evolution of the moving obstacle with each of one or more lanes near the moving obstacle over the period of time determined by using a second MLP network based on the moving obstacle's changing relation with each of the one or more lanes by using an aggregated lane encoding and an intended movement of the moving obstacle, including:

determining the intended movement of the moving obstacle by using non-Euclidean methods based on that the moving obstacle tends to follow the one or more lanes based on a current position of each of the one or more lanes to the moving obstacle and a future shape of each of the one or more lanes based on an overall lane encoding formed from a concatenation by a lane encoding for each lane, a current relative position for each lane, and a subsequent shape for each lane, wherein the first MLP network and the second MLP network are different and include an input layer, a hidden layer and an output layer;

determining an attention score for each lane based on the current relative position for each lane and the lane encoding for each lane; and determining the aggregated lane encoding based on of each lane's overall lane encoding and each lane's attention score;

planning a trajectory of the ADV to control the ADV to avoid a collision with the moving obstacle based on the determined intended movement of the moving obstacle, the obstacle state evolution and the lane-obstacle evolution; and controlling the ADV to navigate based on the planned trajectory of the ADV.

17. The non-transitory machine-readable medium of claim 16, wherein the operations further comprise generating a spatiotemporal graph based on the spatial position of the moving obstacle and the lane-obstacle relation evolution of the moving obstacle with each of the one or more lanes.

18. The non-transitory machine-readable medium of claim 16, wherein the obstacle state evolution of the spatial position of the moving obstacle over the period of time is determined by using at least one of a long short-term memory (LSTM) network, and wherein the lane-obstacle relation evolution of the moving obstacle to each of the one or more lanes over the period of time is determined by using at least one of the long short-term memory (LSTM) network.

19. The non-transitory machine-readable medium of claim 16, wherein the operations further comprise determining the aggregated lane encoding indicating the intended movement of the moving obstacle, wherein the intended movement of the moving obstacle is predicted further based on the aggregated lane encoding.

20. The non-transitory machine-readable medium of claim 19, wherein the operations further comprise, for each of the one or more lanes, determining the lane encoding based on the lane-obstacle relation evolution of the moving obstacle with the lane, the current relative position of the lane to the moving obstacle, and the subsequent shape of the lane.

21. The non-transitory machine-readable medium of claim 20, wherein the operations further comprise, for each of the one or more lanes, determining the attention score of the lane based on the lane-obstacle relation evolution of the moving obstacle with the lane and the current relative position of the lane to the moving obstacle.

22. The non-transitory machine-readable medium of claim 21, wherein the aggregated lane encoding is determined based on a weighted sum of the lane encoding for each of the one or more lanes, wherein a weight for each of the one or more lanes is based on the attention score of the lane.

23. A data processing system, comprising:
a processor; and
a memory coupled to the processor to store instructions, which when executed by the processor, cause the processor to perform operations, the operations including
determining an obstacle state evolution of a spatial position of a moving obstacle over a period of time determined by using a first multi-layer perceptron (MLP) network;
determining a lane-obstacle relation evolution of the moving obstacle with each of one or more lanes near the moving obstacle over the period of time determined by using a second MLP network based on the moving obstacle's changing relation with each of the one or more lanes by using an aggregated lane encoding and an intended movement of the moving obstacle, including:
determining the intended movement of the moving obstacle by using non-Euclidean methods based on that the moving obstacle tends to follow the one or more lanes based on a current position of each of the one or more lanes to the moving obstacle and a future shape of each of the one or more lanes based on an overall lane encoding formed from a concatenation by a lane encoding for each lane, a current relative position for each lane, and a subsequent shape for each lane, wherein the first MLP network and the second MLP network are different and include an input layer, a hidden layer and an output layer;
determining an attention score for each lane based on a current relative position for each lane and the lane encoding for each lane; and
determining the aggregated lane encoding based on each lane's overall lane encoding and each lane's attention score;
planning a trajectory of the ADV to control the ADV to avoid a collision with the moving obstacle based on the determined intended movement of the moving obstacle, the obstacle state evolution and the lane-obstacle evolution; and
controlling the ADV to navigate based on the planned trajectory of the ADV.

24. The data processing system of claim 23, wherein the operations further include generating a spatiotemporal graph based on the spatial position of the moving obstacle and the lane-obstacle relation evolution of the moving obstacle with each of the one or more lanes.

25. The data processing system of claim 23, wherein the obstacle state evolution of the spatial position of the moving obstacle over the period of time is determined by using at least one of a long short-term memory (LSTM) network, and wherein the lane-obstacle relation evolution of the moving obstacle to each of the one or more lanes over the period of time is determined by using at least one of the long short-term memory (LSTM) network.

26. The data processing system of claim 23, wherein the operations further include determining the aggregated lane encoding based on a weighted sum of a lane encoding for each lane of the one or more lanes, wherein a weight for each lane of the one or more lanes is based on the attention score of each lane, wherein the intended movement of the moving obstacle is predicted further based on the aggregated lane encoding.

* * * * *